US 7,803,856 B2

Sep. 28, 2010

(12) United States Patent
Perego et al.

(54) HALOGEN-FREE FLAME RETARDANT POLYAMIDE COMPOSITION WITH IMPROVED ELECTRICAL AND FLAMMABILITY PROPERTIES

(75) Inventors: Carlo Perego, Dalmine (IT); Franciscus Petrus Maria Mercx, Bergen op Zoom (NL); Robert Puyenbroek, Bergen op Zoom (NL); Ramya Kumaraswamy, Karnataka (IN); Hosahalli Ramachandra Manjunath, Karnataka (IN); Sanjay Charati, Karnataka (IN)

(73) Assignee: SABIC Innovative Plastics IP B.V. (NL)

( * ) Notice: Subject to any disclaimer, the term of this patent is extended or adjusted under 35 U.S.C. 154(b) by 1092 days.

(21) Appl. No.: 11/034,083

(22) Filed: Jan. 12, 2005

(65) Prior Publication Data
US 2006/0058432 A1   Mar. 16, 2006

Related U.S. Application Data

(60) Provisional application No. 60/567,851, filed on May 4, 2004.

(51) Int. Cl.
*C08K 5/3492* (2006.01)
(52) U.S. Cl. .................. 524/100; 524/99; 524/126; 524/133; 524/445
(58) Field of Classification Search ........... 524/99–100, 524/126, 133, 445
See application file for complete search history.

(56) References Cited

U.S. PATENT DOCUMENTS

| | | | |
|---|---|---|---|
| 2,071,250 A | 2/1937 | Carothers | |
| 2,071,251 A | 2/1937 | Carothers | |
| 2,130,523 A | 9/1938 | Carothers | |
| 2,130,948 A | 9/1938 | Carothers | |
| 2,241,322 A | 5/1941 | Hanford | |
| 2,312,966 A | 3/1943 | Hanford | |
| 2,512,606 A | 6/1950 | Belton et al. | |
| 3,379,792 A | 4/1968 | Finhoit | |
| 3,634,355 A | 1/1972 | Barr et al. | |
| 3,803,085 A | 4/1974 | Takehoshi et al. | |
| 3,814,869 A | 6/1974 | DeLuca | |
| 3,847,867 A | 11/1974 | Heath et al. | |
| 3,850,885 A | 11/1974 | Takekoshi et al. | |
| 3,852,242 A | 12/1974 | White | |
| 3,855,178 A | 12/1974 | White et al. | |
| 3,884,882 A | 5/1975 | Caywood, Jr. | |
| 3,905,942 A | 9/1975 | Takekoshi et al. | |
| 3,972,902 A | 8/1976 | Heath et al. | |
| 3,983,093 A | 9/1976 | Williams, III et al. | |
| 4,008,203 A | 2/1977 | Jones | |
| 4,108,837 A | 8/1978 | Johnson et al. | |
| 4,147,740 A | 4/1979 | Swiger et al. | |
| 4,174,358 A | 11/1979 | Epstein | |
| 4,175,175 A | 11/1979 | Johnson et al. | |
| 4,251,644 A | 2/1981 | Joffrion | |
| 4,315,086 A | 2/1982 | Ueno et al. | |
| 4,346,194 A | 8/1982 | Roura | |
| 4,455,410 A | 6/1984 | Giles, Jr. | |
| 4,474,927 A | 10/1984 | Novak | |
| 4,490,522 A | 12/1984 | Kawabata et al. | |
| 4,600,741 A | 7/1986 | Aycock et al. | |
| 4,642,358 A | 2/1987 | Aycock et al. | |
| 4,826,933 A | 5/1989 | Grant et al. | |
| 4,837,301 A | 6/1989 | Glock et al. | |
| 4,866,114 A | 9/1989 | Taubitz et al. | |
| 4,927,894 A | 5/1990 | Brown | |
| 4,980,424 A | 12/1990 | Sivavec | |
| 5,041,504 A | 8/1991 | Brown et al. | |
| 5,115,042 A | 5/1992 | Khouri et al. | |
| 5,424,388 A * | 6/1995 | Chen et al. | ..................... 528/73 |
| 5,475,049 A * | 12/1995 | Ohtomo et al. | ............. 524/449 |
| 5,780,534 A | 7/1998 | Kleiner et al. | |
| 6,013,707 A | 1/2000 | Kleiner et al. | |
| 6,166,114 A | 12/2000 | Cosstick et al. | |
| 6,365,071 B1 | 4/2002 | Jenewein et al. | |
| 6,407,200 B1 | 6/2002 | Singh et al. | |
| 6,437,084 B1 | 8/2002 | Birsak et al. | |
| 7,084,197 B2 * | 8/2006 | Chin et al. | ..................... 524/99 |
| 7,205,346 B2 * | 4/2007 | Harashina | ................... 524/133 |
| 2001/0007888 A1* | 7/2001 | Asano | ........................ 524/115 |
| 2004/0021135 A1 | 2/2004 | Steenbakkers-Menting et al. | |
| 2004/0225040 A1 | 11/2004 | Hoerold | |
| 2006/0138391 A1* | 6/2006 | Drewes et al. | ............. 252/601 |
| 2006/0255049 A1* | 11/2006 | McCarthy et al. | ........... 220/703 |

FOREIGN PATENT DOCUMENTS

| | | |
|---|---|---|
| EP | 0332965 | 9/1989 |
| EP | 0657498 | 6/1995 |
| EP | 1522551 | 4/2005 |

* cited by examiner

*Primary Examiner*—Peter Szekely
(74) *Attorney, Agent, or Firm*—Cantor Colburn LLP

(57) ABSTRACT

Flame retardant polyamide compositions are provided containing a polyamide; a flame retardant system including a metal phosphinate or diphosphinate salt and a nitrogen compound; an aromatic polymer, and optionallly untreated nanoclay having an aspect ratio of about 100 to about 1000.

27 Claims, No Drawings

HALOGEN-FREE FLAME RETARDANT POLYAMIDE COMPOSITION WITH IMPROVED ELECTRICAL AND FLAMMABILITY PROPERTIES

CROSS-REFERENCE TO RELATED APPLICATIONS

This application claims the benefits of U.S. Provisional Patent Application Ser. No. 60/567,851 filed May 4, 2004, which is fully incorporated herein by reference.

BACKGROUND OF INVENTION

Polymeric materials used for electrical applications are required to meet stringent industry standards for flame retardant properties, good arc tracking resistance, while at the same time exhibiting good mechanical properties, such as tensile modulus and tensile strength. Increasingly stringent requirements also include meeting or exceeding such standards as the International Electrotechnical Commission (IEC) Glow Wire Flammability Index (GWFI) or Underwriters Laboratories, Inc. UL-94 flammability class rating.

Polyamide resins provide outstanding heat resistance and mold workability, making it useful for a variety of applications. However, polyamide shows poor flame resistance, rendering it necessary for the addition of flame retardants to provide the desired flame retardancy demanded by the particular application. Halogenated compounds and antimony compounds can provide a method to achieve flame retardancy in polyamide compositions. However the presence of bromine and antimony limit their application in the electrical and electronics segment, as well as appliances and transportations. Brominated flame retardants especially raise environmental concerns when the composition is burned.

Known, commercially available glass-reinforced halogen-free flame retardant polyamide materials cannot meet all the industry requirements. For instance, such materials fail to meet UL-94 V0 classification. U.S. Pat. No. 6,365,071 discloses a synergistic flame protection agent combination for thermoplastic polymers, especially for polyesters, containing as component A a phosphinic acid salt, a diphosphinic acid salt, as component B a nitrogen compound including, for example, triazine based compounds, cyanurate based compounds, allantoin based compounds, glycoluril based compounds, benzoguanamine based compounds, and the like. U.S. Patent Application 2004/0021135A1 discloses a halogen-free, flame retarder composition for use in a thermoplastic composition, in particular a glass fiber-reinforced polyamide composition, which flame retarder composition contains at least 10-90 mass percent phosphinate compound, 90-10 mass percent polyphosphate salt of a 1,3,5-triazine compound, and 0-30 mass % olefin copolymer. U.S. Patent Application No. 2004/0225040 discloses a flame retardant nanofilled combination of a thermoplastic polymer, a phosphinic salt, a diphosphinic salt, and an organic intercalated phyllosilicates.

There remains a need for halogen-free flame retardant polyamide compositions that exhibit good flame retardant properties, excellent arc tracking resistance properties, while at the same time retaining good mechanical properties.

BRIEF DESCRIPTION OF THE INVENTION

The invention relates to a fiber reinforced flame-retardant polyamide composition having a combination of good flame retardant properties, good electrical performance such as arc tracking resistance, and good mechanical properties.

In one embodiment, the flame-retardant composition comprises a polyamide; about 5 to about 25 weight percent of a flame retardant system comprising i) a metal phosphinate or diphosphinate salt; and ii) at least one nitrogen compound selected from the group consisting of condensation products of melamine and/or reaction products of condensation products of melamine with phosphoric acid, and/or mixtures thereof, including for example melam, melem, melon, melamine cyanurate, melamine phosphate compounds, dimelamine phosphate and/or melamine pyrophosphate, benzoguanamine compounds, terepthalic ester compounds of tris (hydroxyethyl)isocyanurate, allantoin compounds, glycoluril compounds, ammeline, ammelide, and combinations thereof; and about 1 to about 50 weight percent of at least one aromatic polymer selected from the group consisting of poly(arylene ether), polyetherimide, polyetherimide/polyimide copolymers, poly(arylene sulfide), polysulfone, polyethersulfone, polyetheretherketone, an styrenic impact modifier, and combinations thereof; wherein all the amounts are based upon the total weight of the composition.

In another embodiment, a flame-retardant composition comprises a polyamide; about 5 to about 25 weight percent of a flame retardant system comprising i) a metal phosphinate or diphosphinate salt; and ii) at least one nitrogen compound selected from the group consisting of condensation products of melamine and/or reaction products of condensation products of melamine with phosphoric acid, and/or mixtures thereof, including for example melam, melem, melon, melamine cyanurate, melamine phosphate compounds, dimelamine phosphate and/or melamine pyrophosphate, benzoguanamine compounds, tereptlialic ester compounds of tris(hydroxyethyl)isocyanurate, allantoin compounds, glycoluril compounds, ammeline, ammelide, and combinations thereof; and about 2.5 to about 40 weight percent of poly (arylene ether) or polyetherimide; wherein all the amounts are based upon the total weight of the composition.

In yet another embodiment of either of the flame-retardant composition described above, the composition further comprises an untreated, swellable, ion-exchangeable, layered material having nanometer-thick platelets ranging from about 0.9 nm to about 1000 nm in diameter and an aspect ratio of about 100 to about 1000.

DETAILED DESCRIPTION

The non-halogenated polyamide compositions provided herein exhibit improved flame retardant properties and arc tracking resistance through comparative tracking index (CTI) (class 1 or class 0), as well as excellent ignition results (Glow wire Ignition Temperature (GWIT) of at least 775° C.) rendering them suitable for electrical appliances and electronics components, as well as appliance and transportation applications. Not wishing to be bound by theory, but it is believed that the aromatic polymer acts as a char former, providing the good GWIT results, while at the same time providing excellent mechanical properties, impact resistance, and electrical performance.

It was surprisingly found that the combination of the polyamide, flame retardant system and one of more aromatic compounds selected from the group consisting of poly(arylene ether), polyetherimide, polyetherimide/polyimide copolymers, poly(arylene sulfide), polysulfone, polyethersulfone, polyetheretherketone, and a SMA impact modifier, resulted in a composition exhibiting a minimum GWIT of 775° C. It was surprising as other aromatic-based polymers, like polycarbonate and polyethylene terephthalate, do not yield the desired GWIT results.

The terms "a" and "an" herein do not denote a limitation of quantity, but rather denote the presence of at least one of the referenced item. All ranges disclosed herein are inclusive and combinable.

The polyamide resins include a generic family of resins known as nylons, characterized by the presence of an amide group (—C(O)NH—). Any amide-containing polymers can be employed, individually or in combination: Nylon-6 and nylon-6,6 are suitable polyamide resins available from a variety of commercial sources. Other polyamides, however, such as nylon-4, nylon-4,6 (PA 46), nylon-12, nylon-6,10, nylon-6,9, nylon-6,12, nylon-9T, copolymer of nylon-6,6 and nylon-6, nylon 610 (PA610), nylon 11 (PA11), nylon 12 (PA 12), nylon 6-3-T (PA 6-3-T), polyarylamid (PA MXD 6), polyphthalamide (PPA) and/or poly-ether-block amide, and others such as the amorphous nylons, may also be useful. Mixtures of various polyamides, as well as various polyamide copolymers, are also useful.

The polyamides can be obtained by a number of well-known processes such as those described in U.S. Pat. Nos. 2,071,250; 2,071,251; 2,130,523; 2,130,948; 2,241,322; 2,312,966; and 2,512,606. Nylon-6, for example, is a polymerization product of caprolactam. Nylon-6,6 is a condensation product of adipic acid and 1,6-diaminohexane. Likewise, nylon 4,6 is a condensation product between adipic acid and 1,4-diaminobutane. Besides adipic acid, other useful diacids for the preparation of nylons include azelaic acid, sebacic acid, dodecane diacid, as well as terephthalic and isophthalic acids, and the like. Other useful diamines include m-xylene diamine, di-(4-aminophenyl)methane, di-(4-aminocyclohexyl)methane; 2,2-di-(4-aminophenyl)propane, 2,2-di-(4-aminocyclohexyl)propane, among others. Copolymers of caprolactam with diacids and diamines are also useful.

It is also to be understood that the use of the term "polyamides" herein is intended to include the toughened or super tough polyamides. Super tough polyamides, or super tough nylons, as they are more commonly known, such as those available commercially, e.g. from E.I. duPont under the trade name ZYTEL ST, or those prepared in accordance with U.S. Pat. No. 4,174,358 to Epstein; U.S. Pat. No. 4,474,927 to Novak; U.S. Pat. No. 4,346,194 to Roura; and U.S. Pat. No. 4,251,644 to Jeffrion, among others and combinations comprising at least one of the foregoing, can be employed.

Generally, these super tough nylons are prepared by blending one or more polyamides with one or more polymeric or copolymeric elastomeric toughening agents. Suitable toughening agents are disclosed in the above-identified U.S. patents as well as in U.S. Pat. No. 3,884,882 to Caywood, Jr., U.S. Pat. No. 4,147,740 to Swiger et al.; and "Preparation and Reactions of Epoxy-Modified Polyethylene", J. Appl. Poly. Sci., V 27, pp. 425-437 (1982). Typically, these elastomeric polymers and copolymers may be straight chain or branched as well as graft polymers and copolymers, including core-shell graft copolymers, and are characterized as having incorporated therein either by copolymerization or by grafting on the preformed polymer, a monomer having functional and/or active or highly polar groupings capable of interacting with or adhering to the polyamide matrix so as to enhance the toughness of the polyamide polymer.

The amount of polyamide present in the composition may be about 30 to about 96 weight percent, more specifically about 40 to about 80 weight percent, even more specifically about 50 to about 75 weight percent, or yet more specifically about 60 to about 70 weight percent based on the total weight of the composition.

The composition further comprises a flame retardant system, wherein the flame retardant system comprises phosphinates and/or diphosphinates. Suitable phosphinates and phosphinates include, for example a) a phosphinate of the formula (I), a diphosphinate of the formula (II), polymers of the foregoing, or a combination thereof

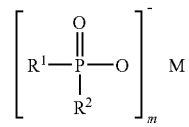

(I)

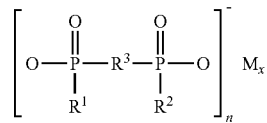

(II)

wherein $R^1$ and $R^2$ are each independently hydrogen, a linear or branched $C_1$-$C_6$ alkyl radical, or aryl radical; $R^3$ is a linear or branched $C_1$-$C_{10}$ alkylene, arylene, alkylarylene, or arylalkylene radical; M is calcium, aluminum, magnesium, strontium, barium, or zinc; m is 2 or 3; n is 1 or 3; and x is 1 or 2; and b) at least one nitrogen compound selected from the group consisting of condensation products of melamine and/or reaction products of condensation products of melamine with phosphoric acid, and/or mixtures thereof, including for example melam, melem, melon, melamine cyanurate, melamine phosphate compounds, dimelamine phosphate and/or melamine pyrophosphate, benzoguanamine compounds, terepthalic ester compounds of tris(hydroxyethyl) isocyanurate, allantoin compounds, glycoluril compounds, ammeline, ammelide, and combinations thereof.

"Phosphinic salt" as used herein includes salts of phosphinic and diphosphinic acids and polymers thereof. Exemplary phosphinic acids as a constituent of the phosphinic salts include dimethylphosphinic acid, ethylmethylphosphinic acid, diethylphosphinic acid, methyl-n-propylphosphinic acid, methanedi(methylphosphinic acid), benzene-1,4-(dimethylphosphinic acid), methylphenylphosphinic acid and diphenylphosphinic acid. The salts of the phosphinic acids of the invention can be prepared by known methods that are described in U.S. Pat. Nos. 5,780,534 and 6,013,707 to Kleiner et al.

Suitable nitrogen compounds include those of the formula (III) to (VIII) or combinations thereof

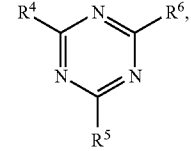

(III)

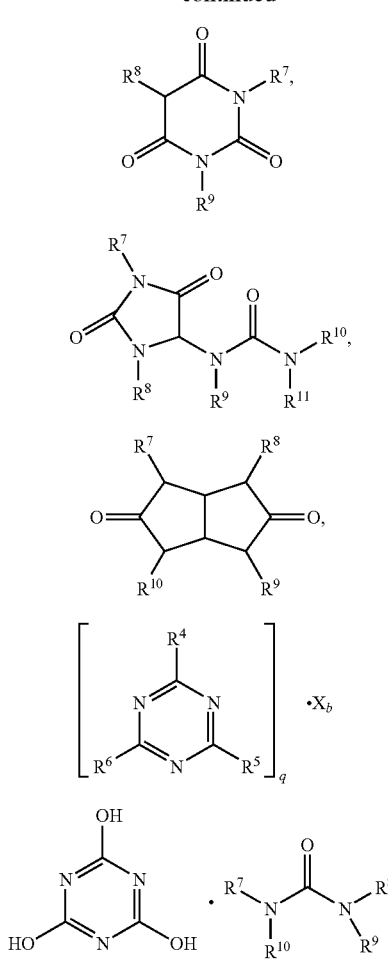

(IV)

(V)

(VI)

(VII)

(VIII)

wherein $R^4$, $R^5$, and $R^6$ are independently hydrogen, hydroxy, amino, or mono- or di$C_1$-$C_8$alkyl amino; or $C_1$-$C_8$alkyl, $C_5$-$C_{16}$cycloalkyl, -alkylcycloalkyl, wherein each may be substituted by a hydroxyl or a $C_1$-$C_4$hydroxyalkyl, $C_2$-$C_8$alkenyl, $C_1$-$C_8$alkoxy, -acyl, -acyloxy, $C_6$-$C_{12}$aryl, —$OR^4$ and —$N(R^4)R^5$; or are N-alicyclic or N-aromatic, where N-alicyclic denotes cyclic nitrogen containing compounds such as pyrrolidine, piperidine, imidazolidine, piperazine, and the like, and N-aromatic denotes nitrogen containing heteroaromatic ring compounds such as pyrrole, pyridine, imidazole, pyrazine, and the like; $R^7$, $R^8$, $R^9$, $R^{10}$ and $R^{11}$ are independently hydrogen, $C_1$-$C_8$alkyl, $C_5$-$C_{16}$cycloalkyl or -alkyl(cycloalkyl), each may be substituted by a hydroxyl or a $C_1$-$C_4$hydroxyalkyl, $C_2$-$C_8$alkenyl, $C_1$-$C_8$alkoxy, -acyl, -acyloxy, $C_6$-$C_{12}$aryl, and —O—$R^4$; X is phosphoric acid or pyrophosphoric acid; q is 1, 2, 3, or 4; and b is 1, 2, 3, or 4.

Exemplary nitrogen compounds include melamine phosphate, melamine, pyrophosphate, melamine polyphosphate, and the like.

The amount of flame retardant system present in the composition may be about 5 to about 25 weight percent based on the total weight of the composition, more specifically about 10 to about 20, and yet more specifically about 12 to about 15 weight percent.

The composition further comprises an aromatic polymer including, for example, poly(arylene ether), polyetherimide, poly(arylene sulfide), polysulfone, polyethersulfone, polyetheretherketone, styrenic impact modifiers, and the like, or a combination comprising at least one of the foregoing aromatic polymers. The aromatic polymer may be present in the composition in an amount of about 1 to about 50 weight percent, specifically about 2 to about 40 weight percent, more specifically about 2.5 to about 30 weight percent, and yet more specifically about 5 to about 20 weight percent based on the total weight of the composition.

In one embodiment, the aromatic polymer of the composition comprises a poly(arylene ether). The term poly(arylene ether) includes polyphenylene ether (PPE) and poly(arylene ether) copolymers; graft copolymers; poly(arylene ether) ether ionomers; and block copolymers of alkenyl aromatic compounds, vinyl aromatic compounds, and poly(arylene ether), and the like; and combinations comprising at least one of the foregoing; and the like. Poly(arylene ether)s per se, are known polymers comprising a plurality of structural units of the formula (IX):

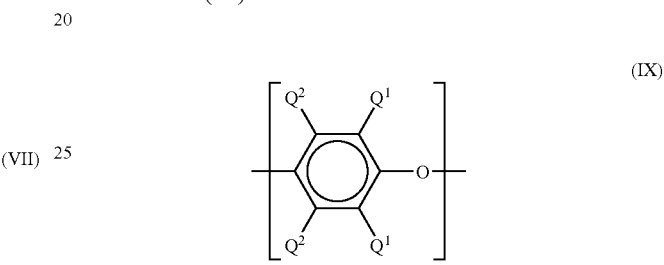

(IX)

wherein for each structural unit, each $Q^1$ is independently halogen, primary or secondary lower alkyl (e.g., alkyl containing up to 7 carbon atoms), phenyl, haloalkyl, aminoalkyl, hydrocarbonoxy, or halohydrocarbonoxy wherein at least two carbon atoms separate the halogen and oxygen atoms, or the like; and each $Q^2$ is independently hydrogen, halogen, primary or secondary lower alkyl, phenyl, haloalkyl, hydrocarbonoxy, or halohydrocarbonoxy wherein at least two carbon atoms separate the halogen and oxygen atoms, or the like. It will be understood that the term "haloalkyl" includes alkyl groups substituted with one or more halogen atoms, including partially and fully halogenated alkyl groups. Preferably, each $Q^1$ is alkyl or phenyl, especially $C_{1-4}$ alkyl, and each $Q^2$ is hydrogen or $C_{1-4}$ alkyl.

Both homopolymer and copolymer poly(arylene ether) are included. The preferred homopolymers are those containing 2,6-dimethylphenylene ether units. Suitable copolymers include random copolymers containing, for example, such units in combination with 2,3,6-trimethyl-1,4-phenylene ether units or copolymers derived from copolymerization of 2,6-dimethylphenol with 2,3,6-trimethylphenol. Also included are poly(arylene ether) containing moieties prepared by grafting vinyl monomers or polymers such as polystyrenes, as well as coupled poly(arylene ether) in which coupling agents such as low molecular weight polycarbonates, quinones, heterocycles and formals undergo reaction in known mainer with the hydroxy groups of two poly(arylene ether) chains to produce a higher molecular weight polymer. Poly(arylene ether)s further include combinations comprising at least one of the above. Preferred poly(arylene ether)s are poly(2,6-dimethylphenylene ether) and poly(2,6-dimethylphenylene ether-co-2,3,6-trimethylphenylene ether) such as those described in U.S. Pat. No. 6,407,200 to Singh et al. and U.S. Pat. No. 6,437,084 to Birsak et al.

Suitable poly(arylene ether)s include, but are not limited to, poly(2,6-dimethyl-1,4-phenylene ether); poly(2,3,6-trimethyl-1,4-phenylene) ether; poly(2,6-diethyl-1,4-phenylene) ether; poly(2-methyl-6-propyl-1,4-phenylene) ether; poly(2,6-dipropyl-1,4-phenylene) ether; poly(2-ethyl-6-propyl-1,4-phenylene)ether; poly(2,6-dilauryl-1,4-phenylene) ether; poly(2,6-diphenyl-1,4-phenylene) ether; poly(2,6-dimethoxy-1,4 phenylene) ether; poly(2,6-diethoxy-1,4-phenylene) ether; poly(2-methoxy-6-ethoxy-1,4-phenylene) ether; poly(2-ethyl-6-stearyloxy-1,4-phenylene) ether; poly(2,6-dichloro-1,4-phenylene) ether; poly(2-methyl-6-phenyl-1,4-phenylene) ether; poly(2-ethoxy-1,4-phenylene) ether; poly(2-chloro-1,4-phenylene) ether; poly(2,6-dibromo-1,4-phenylene) ether; poly(3-bromo-2,6-dimethyl-1,4-phenylene) ether; or a mixture of the foregoing poly(arylene ether)s.

In one embodiment where the composition comprises polyamide and poly(arylene ether), the composition may further comprise a compatibilizing agent to improve the physical properties of the poly(arylene ether)-polyamide resin blend, as well as to enable the use of a greater proportion of the polyamide component. When used herein, the expression "compatibilizing agent" refers to those polyfunctional compounds which interact with the poly(arylene ether), the polyamide, or, preferably, both. This interaction may be chemical (e.g. grafting) or physical (e.g. affecting the surface characteristics of the dispersed phases). hi either case the resulting poly(arylene ether)-polyamide composition appears to exhibit improved compatibility, particularly as evidenced by enhanced impact strength, mold knit line strength and/or elongation. As used herein, the expression "compatibilized poly(arylene ether)-polyamide base resin" refers to those compositions which have been physically or chemically compatibilized with an agent as discussed above, as well as those compositions which are physically compatible without such agents, as taught, for example, in U.S. Pat. No. 3,379,792.

Suitable compatibilizing agents include, for example, liquid diene polymers, epoxy compounds, oxidized polyolefin wax, quinones, organosilane compounds, polyfunctional compounds, and functionalized polyphenylene ethers obtained by reacting one or more of the previously mentioned compatibilizing agents with polyphenylene ether.

The above and other compatibilizing agents are more fully described in U.S. Pat. Nos. 4,315,086; 4,600,741; 4,642,358; 4,826,933; 4,866,114; 4,927,894; 4,980,424; 5,041,504; and 5,115,042. The foregoing compatibilizing agents may be used alone or in various combinations of one another with another. Furthermore, they may be added directly to the melt blend or pre-reacted with either or both the polyphenylene ether and polyamide, as well as with other resinous materials employed in the preparation of the compositions of the present invention.

Where the compatibilizing agent is employed in the preparation of the compositions of the present invention, the initial amount used will be dependent upon the specific compatibilizing agent chosen and the specific polymeric system to which it is added. Generally, when present, the compatibilizing agent may be present in an amount of about 0.01 weight percent to about 25 weight percent, more specifically about 0.4 to about 10 weight percent, and more specifically about 1 to about 3 weight percent, based on the total weight of the composition.

In yet another embodiment, the aromatic polymer of composition comprises polyetherimide resins, known compounds whose preparation and properties are described in U.S. Pat. Nos. 3,803,085 and 3,905,942.

The polyetherimide used for preparing the blends of this invention comprises more than 1, more specifically about 10 to 1000 or more, and yet more specifically about 10 to about 500 structural units, of the formula (X):

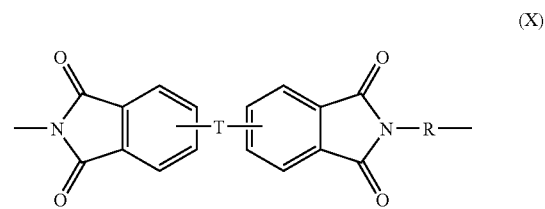

wherein T is —O— or a group of the formula —O—Z—O— wherein the divalent bonds of the —O— or the —O—Z—O— group are in the 3,3', 3, 4', 4,3', or the 4,4' positions; Z includes, but is not limited to, a divalent radical of formulae (XI):

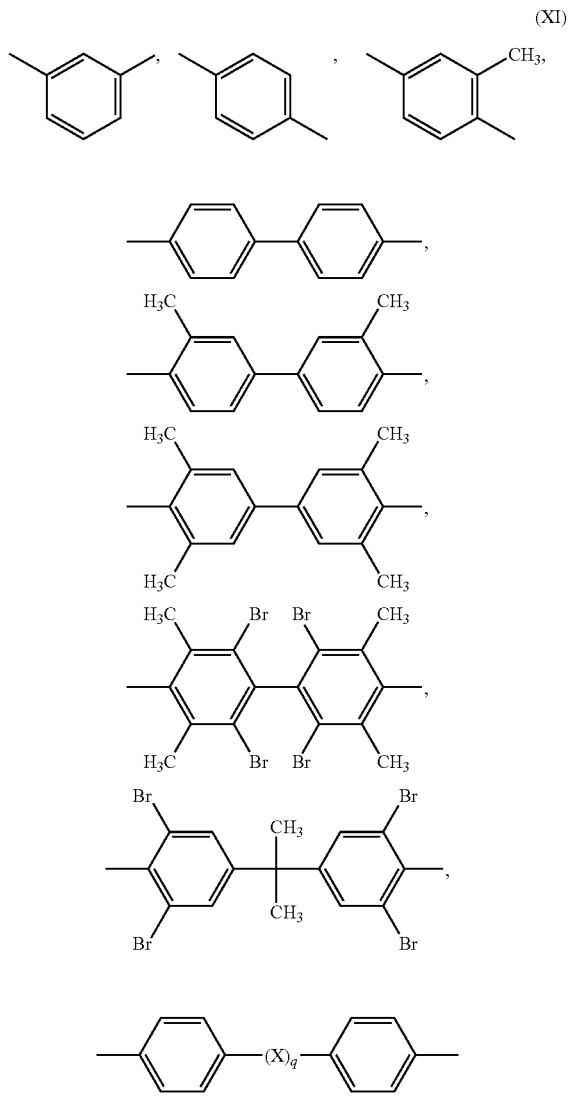

wherein X includes, but is not limited to, divalent radicals of the formulae (XII):

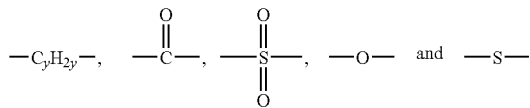

(XII)

wherein y is an integer from 1 to about 5, and q is 0 or 1; R includes, but is not limited to, a divalent organic radical: (a) aromatic hydrocarbon radicals having from 6 to about 20 carbon atoms, (b) alkylene radicals having from about 2 to about 20 carbon atoms, (c) cycloalkylene radicals having from about 3 to about 20 carbon atoms, and (d) divalent radicals of the general formula (XIII):

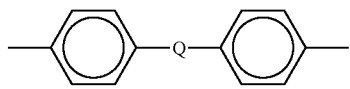

(XIII)

where Q includes, but is not limited to, the formulae (XIV):

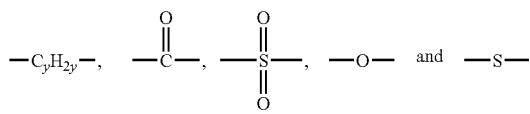

(XIV)

where y is an integer from about 1 to about 5.

In one embodiment, the polyetherimide may be a copolymer that, in addition to the etherimide units described above, further contains polyimide structural units of the formula (XV):

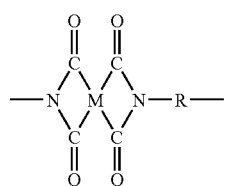

(XV)

wherein R is as previously defined for formula (X) and M includes, but is not limited to, formulae (XVI), (XVII), and (XVIII):

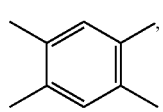

(XVI)

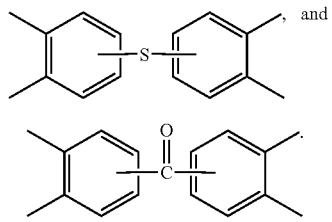

(XVII), and (XVIII)

Examples of specific aromatic bis(etlier anhydrides) and organic diamines are disclosed, for example, in U.S. Pat. Nos. 3,972,902 and 4,455,410. Included among the many methods of making the polyetherimide are those disclosed in U.S. Pat. Nos. 3,847,867, 3,814,869, 3,850,885, 3,852,242, 3,855,178, and 3,983,093.

In yet another embodiment, the composition comprises a polyarylene sulfide as the aromatic polymer component. The term polyarylene sulfide includes polyphenylene sulfide (PPS), polyarylene sulfide ionomers, polyarylene sulfide copolymers, polyarylene sulfide graft copolymers, block copolymers of polyarylene sulfides with alkenyl aromatic compounds or with vinyl aromatic compounds, and combinations comprising at least one of the foregoing polyarylene sulfides. Polyarylene sulfides are known polymers comprising a plurality of structural units of the formula —R—S— wherein R is an aromatic radical such as phenylene, biphenylene, naphthylene, oxydiphenyl, or diphenyl sulfone. Known methods of preparing poly(arylene sulfide) include those described in U.S. Pat. Nos. 4,490,522 to Kawabata et al and U.S. Pat. No. 4,837,301 to Glock et al.

Still another embodiment comprises polysulfone or polyether sulfone as the aromatic polymer component. Polysulfones, polyether sulfones, and polyarylene ether sulfones are known thermoplastic polymers frequently prepared as described in U.S. Pat. Nos. 3,634,355; 4,008,203; 4,108,837; and 4,175,175. A variety of polyaryl ether sulfones are commercially available, including the polycondensation product of dihydroxydiphenyl sulfone with dichlorodiphenyl sulfone and known as polyether sulfone (PES) resin, and the polymer of bisphenol-A and dichlorodiphenyl sulfone known in the art as polysulfone (PSF) resin. A variety of PES copolymers, for example comprising Bisphenol A moieties and diphenyl sulfone moieties in molar ratios other than 1:1, may also be found.

Yet another embodiment includes polyetheretherketone as the aromatic polymer component of the composition. Polyetheretherketone polymers are known polymers generally having the following structure

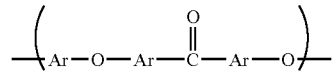

wherein Ar includes an aryl group such as phenyl, including, for example, poly(oxy-p-phenyleneoxy-p-phenylenecarbonyl-p-phenylene.

In yet another embodiment, the aromatic polymer comprises styrenic impact modifiers. Exemplary styrenic impact modifiers include styrene block copolymers including styrene-butadiene-styrene copolymer (SBS), styrene-(ethylene-butene)-styrene (SEBS), styrene butadiene rubbers (SBR), acrylonitrile-butadiene-styrene copolymers (ABS), styrene-maleic anhydride (SMA) copolymers, alkyl methacrylate styrene acrylonitrile (AMSAN), methylmethacrylate-butadiene-styrene (MBS), combinations comprising at least one of the foregoing impact modifiers, and the like. Other suitable impact modifiers include styreno-(ethylene-propylene)-styrene (SEPS), styrene-(ethylene-butene) (SEB), styrene-(ethylene-propylene) (SEP), styrene-isoprene-styrene (SIS), styrene-isoprene, styrene-butadiene, α-methylstyrene-isoprene-α-methylstyrene, α-methylstyrene-butadiene-α-methylstyrene, as well as hydrogenated versions. The styrene block copolymers may be the linear or radial type, and the di-block or tri-block type. Commercially available styrene block copolymers include KRATON available from Shell and K-RESIN available from Chevron Phillips Chemical Company.

In one embodiment, wherein the composition does not contain an aromatic polymer selected from the group consisting of poly(arylene ether), polyetherimide, poly(arylene sulfide), polysulfone, polyethersulfone, and polyetheretherketone, the composition comprises an SMA impact modifier, or a blend of SMA and an additional impact modifier, for example SEBS.

In another embodiment, the composition comprises an aromatic polymer and an impact modifier. When the composition comprises an impact modifier separate from the aromatic polymer, the amount of impact modifier present in the composition may be about 0 to about 20 weight percent, more specifically about 5 to about 15 weight percent, or even more specifically about 8 to about 10 weight percent based on the total weight of the composition.

In one embodiment, the composition may optionally further comprise untreated, swellable, ion-exchangeable, layered material having nanometer-thick platelets ranging from about 0.9 nm to about 1000 nm in diameter and an aspect ratio of about 100 to about 1000, that sufficiently sorb the polymer composition to increase the interlayer spacing between adjacent platelets of the layered material to at least about 10 Angstroms (when the material is measured dry) may be used. The term ion-exchangeable refers to compounds having a crystal structure in which the surfaces thereof are laminated, for instance, by ionic bond, in parallel to each other to form the crystal structure. Examples include nanoclay, colloidal clay, or organophilic clay.

While the term "clay" or "nanoclay" or clay minerals will be used herein, another description would be "intercalated phyllosilicate" or "intercalated layered silicate." This description refers to a collection of fine and hydrous silicate minerals, and when an appropriate quantity of water is added to and the clay is kneaded, the plasticity is generated, and when the material is calcinated at a high temperature, sintering occurs. The material used herein can be the natural products as well as synthesized ones.

In one embodiment, the clay minerals are phylosillicates, including a phyllosilicic acid or a phylosillicate. The phylosillicates include, as natural products, clay minerals in the geological classes of the smectites, the kaolins, the illites, the chlorites, the attapulgites and the mixed layer clays. Typical examples of specific clays belonging to these classes are the smectices, kaolins, illites, chlorites, attapulgites and mixed layer clays. Smectites, for example, include montmorillonite, bentonite, pyrophyllite, hectorite, saponite, sauconite, nontronite, talc, beidellite, volchonskoite and vermiculite. Kaolins include kaolinite, dickite, nacrite, antigorite, anauxite, halloysite, indellite and chrysotile. Illites include bravaisite, muscovite, paragonite, phlogopite and biotite. Chlorites include corrensite, pennine, donbassite, sudoite, pennine and clinochlore. Attapulgites include sepiolite and polygorskyte. Mixed layer clays include allevardite and vermiculitebiotite.

The synthesized phylosilicates include, for instance, fluorine quad silicon mica, laponite, smectone. In addition, such ion crystalline compounds as $\alpha$-Zr(HPO$_4$)$_2$, $\gamma$-Zr (HPO$_4$)$_2$, $\alpha$-Ti(HPO$_4$)$_2$, and $\gamma$-Ti(HPO$_4$)$_2$, which are no clay minerals but has the layered crystal structure may be used for this purpose.

The amount of untreated, swellable, ion-exchangeable, layered material present in the composition may be about 0 to about 20 weight percent. In one embodiment from 2 to 15 weight percent. In another embodiment, from 2 to 10 weight percent based on the total weight of the composition.

The composition may optionally further comprise filler, including fibrous filler and/or low aspect ratio filler. Suitable fibrous filler may be any conventional filler used in polymeric resins and having an aspect ratio greater than 1. Such fillers may exist in the form of whiskers, needles, rods, tubes, strands, elongated platelets, lamellar platelets, ellipsoids, micro fibers, nanofibers and nanotubes, elongated fullerenes, and the like. Where such fillers exist in aggregate form, an aggregate having an aspect ratio greater than 1 will also suffice for the fibrous filler.

Suitable fibrous fillers include, for example, glass fibers, such as E, A, C, ECR, R, S, D, and NE glasses and quartz, and the like may be used as the reinforcing filler. Other suitable inorganic fibrous fillers include those derived from blends comprising at least one of aluminum silicates, aluminum oxides, magnesium oxides, and calcium sulfate hemihydrate. Also included among fibrous fillers are single crystal fibers or "whiskers" including silicon carbide, alumina, boron carbide, iron, nickel, or copper. Other suitable inorganic fibrous fillers include carbon fibers, aramid fibers, stainless steel fibers, metal coated fibers, and the like.

In addition, organic reinforcing fibrous fillers may also be used including organic polymers capable of forming fibers. Illustrative examples of such organic fibrous fillers include poly(ether ketone), polyimide, polybenzoxazole, poly(phenylene sulfide), polycarbonate, aromatic polyamides including aramid, aromatic polyimides or polyetherimides, polytetrafluoroethylene, acrylic resins, and poly( vinyl alcohol). Such reinforcing fillers may be provided in the form of monofilament or multifilament fibers and can be used either alone or in combination with other types of fiber, through, for example, co-weaving or core/sheath, side-by-side orange-type or matrix and fibril constructions, or by other methods known to one skilled in the art of fiber manufacture.

Non-limiting examples of low aspect fillers include silica powder, such as fused silica, crystalline silica, natural silica sand, and various silane-coated silicas; boron-nitride powder and boron-silicate powders; alkaline earth metal salts; alumina and magnesium oxide (or magnesia); wollastonite, including surface-treated wollastonite; calcium sulfate (as, for example, its anhydride, dihydrate or trihydrate); calcium carbonates including chalk, limestone, marble and synthetic, precipitated calcium carbonates, generally in the form of a ground particulate which often comprises 98+% $CaCO_3$ with the remainder being other inorganics such as magnesium carbonate, iron oxide and alumino-silicates; surface-treated calcium carbonates; other metal carbonates, for example magnesium carbonate, beryllium carbonate, strontium carbonate, barium carbonate, and radium carbonate; talc; glass powders; glass-ceramic powders; clay including calcined clay, for example kaolin, including hard, soft, calcined kaolin; mica; feldspar and nepheline syenite; salts or esters of orthosilicic acid and condensation products thereof, silicates including aluminosilicate, calcium silicate, and zirconium silicate; zeolites; quartz; quartzite; perlite; diatomaceous earth; silicon carbide; zinc sulfide; zinc oxide; zinc stannate; zinc hydroxystannate; zinc phosphate; zinc borate; aluminum phosphate; barium titanate; barium ferrite; barium sulfate and heavy spar; particulate aluminum, bronze, zinc, copper and nickel; carbon black, including conductive carbon black; flaked fillers such as glass flakes, flaked silicon carbide, aluminum diboride, aluminum flakes, and steel flakes; and the like. Examples of such fillers well known to the art include those described in "Plastic Additives Handbook, 4$^{th}$ Edition" R. Gachter and H. Muller (eds.), P. P. Klemchuck (assoc. ed.) Hansen Publishers, New York 1993.

The total amount of filler present in the composition may be about 0 to about 60 weight percent, more specifically about 5 to about 35 weight percent, or even more specifically about 10 to about 30 weight percent based on the total weight of the composition. In one embodiment, the ratio of reinforcing filler to non-reinforcing inorganic mineral filler is greater than 1, especially greater than about 1.2, and more especially greater than about 1.5.

The composition may optionally further comprise other additives known in the art. Suitable additives include wear additives, for example, polytetrafluoroethylene (PTFE), molybdenum disulfide (MOS$_2$), graphite, aramide, carbon fibers, carbon powder, combinations comprising at least one of the foregoing wear additives, and the like. The amount of wear additive present in the composition may be about 0 to about 20 weight percent, more specifically about 1 to about 15 weight percent, or even more specifically about 5 to about 10 weight percent based on the total weight of the composition.

The composition may optionally further comprise a charring catalyst, for example, a metal salt of a tungstic acid or a complex oxide acid of tungsten and a metalloid, a tin oxide salt such as sodium tin oxide, and/or ammonium sulfamate. Suitable metal salts include alkali metal salts of a tungstic acid, such as sodium tungstate. By a complex oxide acid of tungsten and a metalloid is meant a complex oxide acid formed by a metalloid such as phosphorous or silicon and tungsten. Exemplary complex oxide acids include silicotungstic acid and phosphotungstic acid. When used, the charring catalyst may be present in an amount of up to about 10 weight percent based on the total weight of the composition, more specifically about 0.1 to about 10 weight percent, and yet more specifically about 0.1 to about 2 weight percent.

Another optional component of the composition includes a char former such as a polyhydric alcohol, for example penterythritol or dipenterythritol; a novolac; vinyl alcohols; starches; etc., as described in U.S. Pat. No. 6,166,114, in an amount of up to about 10 weight percent based on the total weight of the composition. In one embodiment, from 0.1 to about 10 weight percent. In another embodiment, from 0.1 to about 2 weight percent.

Other customary additives may be added to all of the resin compositions at the time of mixing or molding of the resin in amounts as necessary which do not have any deleterious effect on physical properties. For example, coloring agents (pigments or dyes), heat-resistant agents, oxidation inhibitors, organic fibrous fillers, weather-proofing agents, lubricants, mold release agents, plasticizer, and fluidity enhancing agents, and the like, may be added.

It should be clear that the invention encompasses reaction products of the above-described compositions.

The preparation of the compositions may be achieved by blending the ingredients under conditions for the formation of an intimate blend. All of the ingredients may be added initially to the processing system, or else certain additives may be precompounded with one or more of the primary components. When the composition comprises a compatibilized blend of polyamide and poly(arylene ether), the poly(arylene ether) may be initially precompounded with impact modifier, optionally with any other ingredients, prior to compounding with the polyamide resin. The other ingredients may include some of the polyamide used to prepare the composition, while the remaining portion of the polyamide is fed through a port downstream.

The blend may be formed by mixing in single or twin screw type extruders or similar mixing devices which can apply a shear to the components. In another embodiment, long fibers may be blended into the master batch at the injection molding machine.

In one embodiment, separate extruders are used in the processing of the blend. In another embodiment, the composition is prepared by using a single extruder having multiple feed ports along its length to accommodate the addition of the various components. A vacuum may be applied to the melt through at least one or more vent ports in the extruder to remove volatile impurities in the composition.

In one embodiment, the compatibilized blend of polyamide and poly(arylene ether) is blended with the flame retardant system and reinforcing filler, such as chopped glass strands, in a Henschel high speed mixer. Other low shear processes including but not limited to hand mixing may also accomplish this blending. The blend is then fed into the throat of a twin-screw extruder via a hopper. Alternately the glass may be incorporated into the composition by feeding unchopped strands directly into the extruder. The dispersed glass fibers are reduced in length as a result of the shearing action on the glass strands in the extruder barrel In another embodiment, the reinforcing filler, e.g., glass fiber, is not blended in with the flame retardant polymer system, but it is incorporated into the flame-retardant polymer composition by a process known as pultrusion, which process is described in a number of references, for example, U.S. Pat. Nos. 3,993,726 and 5,213,889. In the pultrusion process, a tow or roving of fibers is pulled through a bath of molten polymer to impregnate the fiber. The impregnated fiber product may be pulled through a means for consolidating the product such as a sizing die. In one embodiment, the impregnated product may be wound on rolls for subsequent use in fabrication processes requiring a continuous product. In yet another embodiment, the fiber impregnated by the composition of the invention may be chopped into pellets or granules, in which the aligned fibers have lengths from 2 mm up to 100 mm. These may be used in conventional moulding or extrusion processes for forming articles.

In one embodiment, the compositions are used to prepare molded articles such as for example, durable articles, structural products, and electrical and electronic components, and the like. The compositions may be converted to articles using common thermoplastic processes such as film and sheet extrusion, injection molding, gas-assisted injection molding, extrusion molding, compression molding and blow molding. Film and sheet extrusion processes may include and are not limited to melt casting, blown film extrusion, and calendaring. Co-extrusion and lamination processes may be employed to form composite multi-layer films or sheets. Single or multiple layers of coatings may further be applied to the single or multilayer substrates to impart additional properties such as scratch resistance, ultra violet light resistance, aesthetic appeal, and the like. Coatings may be applied through standard application techniques such as rolling, spraying, dipping, brushing, or flow-coating. Film and sheet of the invention may alternatively be prepared by casting a solution or suspension of the composition in a suitable solvent onto a substrate, belt or roll followed by removal of the solvent In one embodiment, the compositions when prepared into 1.6 millimeter (mm) test specimens, exhibit a flammability class rating according to UL-94 of at least V2, more specifically at least V1, and yet more specifically at least V0.

In yet another embodiment, the composition exhibits a comparative tracking index (CTI) measured according to International Electrotechnical Commission (IEC) standard IEC-60112/$3^{rd}$ using a test specimen having a thickness of 4.0 mm and a diameter of a minimum of 60.0 mm of greater than about 400 Volts, specifically greater than about 500 Volts, yet more specifically greater than about 550 Volts, and still yet more specifically greater than about 600 Volts. A tracking index of 400 to 599 Volts corresponds to class 1, and 600 Volts and greater is class 0.

The compositions described herein have been found to exhibit a Glow Wire Flammability Index (GWFI) as measured according to IEC-60695-2-12 of 960° C. at a test specimen thickness of about 1.6 mm. Furthermore, the compositions described herein have been found to exhibit a Glow Wire Ignition Temperature (GWIT) as measured according to IEC-60695-2-13 of 750° C. or greater at a test specimen thickness of about 1.6 mm, more specifically greater than about 750° C., and yet more specifically greater than about 800° C.

It should be clear that compositions and articles made from the compositions made by the method of this disclosure are within the scope of the invention. All cited patents, patent applications, and other references are incorporated herein by reference in their entirety.

EXAMPLES

The invention is further illustrated by the following non-limiting examples. The formulations for the Examples were prepared from the components listed in Table 1 below.

TABLE 1

| Component | Trade Name | Description |
|---|---|---|
| PA 6 2,4RV | Radipol A24S | Polyamide-6 |
| PA 66 2,4RV | Radipol A40D | Polyamide-66 |
| Glass fiber | DS1103-10P | |
| Melamine cyanurate | Melapur MC25 | Flame retardant |
| Component A | Exolit OP1312 | Flame retardant system containing a metal phosphinate and a nitrogen compound available from Clariant |
| PEI | Ultem 1010 | Polyetherimide |
| PPE pre-blend | | Pre-blend of 80.3 weight % poly(2,6-dimethylphenylene ether); 18.5 weight percent styrene-butadiene-styrene triblock copolymer; 1.2 weight percent compatibilizer: 2-hydroxypropane-1,2,3-tricarboxylic acid |
| PET | | Polyethylene Terephthalate |
| PC | Lexan 101 | Polycarbonate |
| HIPS | | High impact polystyrene |
| SEBS | Kraton G1657 | Impact modifier |
| SEBS-MA | Kraton FG1901X | Impact modifier |
| SMA | Dylark | Impact modifier |
| AO1 | Irganox 1098 | Anti-oxidant |
| AO2 | Irgafos 168 | Anti-oxidant |
| Mold release | | Aluminum stearate |
| Phyllosilicate | Dellite 67 G - treated Phyllosilicate) (Cloisite Na+) from Southern Clay Products - untreated phyllosilicate (Table 6 expt No: 29 & 30) | Nanoclay |
| Calcinated Clay | | |

The components were compounded in a corotating twin-screw extruder (Werner & Pfleiderer, type ZSK40), using a screw design having a mid range screw severity, at a melt temperature of 270 to 300° C., and at rates of 45 to 100 kilograms per hour. The resulting resin mixtures were then molded into bars using typical injection molding machines, ranging from laboratory-sized machines to commercial sized machines. Melt temperatures were about 270-300° C., and mold temperature were about 50-120° C. The molded bars were then tested according to the tests below.

Flammability tests were performed following the procedure of Underwriters Laboratories Inc., Bulletin 94 entitled "Tests for Flammability of Plastic Materials for Parts in Devices and Appliances, UL94" of a 0.8 mm and 1.6 mm test piece in the vertical position. According to this procedure, the materials were classified as V-0, V-1, or V-2 on the basis of the test results.

The tensile modulus and strength were measured by ISO Standard 527/1 using a test piece having a thickness of 4.0 mm. The units of tensile modulus is provided in Giga Pascal (GPa) and the units of tensile strength are provided in Mega Pascal (MPa).

The Izod notched impact was measured according to ISO 180-1A and the results are provided in units of Kilo Joules per squared meter (KJ/m$^2$).

The comparative tracking index (CTI) was measured according to International Electrotechnical Commission (IEC) standard IEC-60112/$3^{rd}$ using a test specimen having a thickness of 4.0 mm and a diameter of a minimum of 60.0 mm. A tracking index of 400 to 599 Volts corresponds to class 1, and 600 Volts and greater is class 0.

The Glow Wire Flammability Index (GWFI) was measured according to IEC-60695-2-12 using a specimen having a thickness of 1.0 and 1.6 mm and a dimension of 60.0 by 60.0 mm.

The Glow Wire Ignition Temperature (GWIT) was measured according to IEC-60695-2-13 using a specimen having a thickness of 1.0 and 1.6 mm and a dimension of 60.0 by 60.0 mm.

Table 2 contains the results of testing samples of glass fiber filled polyamide compositions containing the flame retardant system comprising a phosphinic salt and a nitrogen compound (Component A). N.C. stands for not classified.

TABLE 2

|  | CE1 | CE2 | CE3 | CE4 | CE5 | CE6 | CE7 | CE8 | CE9 | CE10 |
|---|---|---|---|---|---|---|---|---|---|---|
| Components | | | | | | | | | | |
| PA 6 2,4RV | 34.70 | 29.70 | 24.70 | 19.70 | 35.95 | 34.70 | 32.20 | 29.70 | 28.45 | 27.20 |
| PA66 2,4RV | 34.70 | 29.70 | 24.70 | 19.70 | 35.95 | 34.70 | 32.20 | 29.70 | 28.45 | 27.20 |
| Glass Fiber | 15.00 | 25.00 | 35.00 | 45.00 | 25.00 | 25.00 | 25.00 | 25.00 | 25.00 | 25.00 |
| Component A | 15.00 | 15.00 | 15.00 | 15.00 | 2.50 | 5.00 | 10.00 | 15.00 | 17.50 | 20.00 |
| AO1 | 0.20 | 0.20 | 0.20 | 0.20 | 0.20 | 0.20 | 0.20 | 0.20 | 0.20 | 0.20 |
| AO2 | 0.15 | 0.15 | 0.15 | 0.15 | 0.15 | 0.15 | 0.15 | 0.15 | 0.15 | 0.15 |
| Mold release | 0.25 | 0.25 | 0.25 | 0.25 | 0.25 | 0.25 | 0.25 | 0.25 | 0.25 | 0.25 |
| Properties | | | | | | | | | | |
| Tensile Modulus (GPa) | 6.8 | 9.4 | 12.2 | 14.1 | 8.9 | 8.4 | 8.9 | 9.4 | 9.5 | 9.7 |
| Tensile Strength (MPa) | 112.0 | 140.0 | 166.5 | 189.3 | 161.2 | 153.5 | 155.0 | 140.0 | 138.0 | 125.0 |
| Izod notched impact (KJ/m$^2$) | 7.4 | 9.5 | 11.2 | 12.4 | 8.7 | 9.2 | 8.6 | 9.5 | 9.0 | 7.5 |
| CTI (volts) | 600 | 600 | 600 | 600 | 600 | 600 | 600 | 600 | 600 | 600 |
| GWFI 960° C. @ 1.0 mm | pass | pass | pass | pass | fail | pass | pass | pass | pass | pass |
| UL class @ 0.8 mm | V2 | V2 | V0 | V0 | V2 | V2 | V2 | V2 | V0 | V0 |
| UL class @ 1.6 mm | V0 | V0 | V0 | V0 | V2 | V2 | n.c. | V0 | V0 | V0 |
| GWIT @ 1.0 mm | 700 | 675 | 750 | 750 | fail | fail | fail | 675 | 700 | 725 |
| GWIT @ 1.6 mm | 725 | 725 | 750 | 750 | fail | fail | fail | 725 | 725 | 725 |

As illustrated in the Table 2, Comparative Examples 1 to 10 show that non-halogenated glass-reinforced polyamide compositions without an aromatic polymer did not meet a GWIT of 775° C.

Table 3 contains the test results of glass fiber filled polyamide compositions containing the flame retardant system comprising a phosphinic salt and a nitrogen compound, and further comprising an aromatic polymer.

In Table 3, the examples are all based on compositions containing the flame retardant system and an aromatic polymer. Examples 11 to 14, containing PEI and PPE passed GWIT 775° C. Comparative Examples 15-16 and 17 contained aromatic polycarbonate and polyethylene terephthalate, respectively. As illustrated by the GWIT results, these aromatic polymers do not improve the GWIT results of the composition. Additionally, these compositions showed poor flame resistance according to UL 94. Example 18 prepared from compatibilized polyamide/PPE blends met both GWIT and UL 94 (V0), while at the same time maintaining acceptable mechanical and impact resistance.

TABLE 3

|  | CE11 | CE12 | CE13 | CE14 | CE15 | CE16 | CE17 | CE18 | CE19 | CE20 |
|---|---|---|---|---|---|---|---|---|---|---|
| Component | | | | | | | | | | |
| PA 6 2,4RV | 24.70 | 19.70 | 24.70 | 19.70 | 24.70 | 19.70 | 24.70 | 23.20 | 20.70 | 20.70 |
| PA66 2,4RV | 24.70 | 19.70 | 24.70 | 19.70 | 24.70 | 19.70 | 24.70 | 23.20 | 20.70 | 20.70 |
| Glass fiber | 25.00 | 25.00 | 25.00 | 25.00 | 25.00 | 25.00 | 25.00 | 25.00 | 25.00 | 25.00 |
| Component A | 15.00 | 15.00 | 15.00 | 15.00 | 15.00 | 15.00 | 15.00 | 15.00 | 15.00 | 15.00 |
| PEI | 10.00 | 20.00 | — | — | — | — | — | — | — | — |
| PPE-preblend | — | — | 2.50 | 5.00 | — | — | — | 13.00 | 18.00 | 18.00 |
| PET | — | — | — | — | — | — | 10.00 | — | — | — |
| PC | — | — | — | — | 10.00 | 20.00 | — | — | — | — |
| HIPS | — | — | 7.50 | 15.00 | — | — | — | — | — | — |
| AO1 | 0.20 | 0.20 | 0.20 | 0.20 | 0.20 | 0.20 | 0.20 | 0.20 | 0.20 | 0.20 |
| AO2 | 0.15 | 0.15 | 0.15 | 0.15 | 0.15 | 0.15 | 0.15 | 0.15 | 0.15 | 0.15 |
| Mold release | 0.25 | 0.25 | 0.25 | 0.25 | 0.25 | 0.25 | 0.25 | 0.25 | 0.25 | 0.25 |
| Properties | | | | | | | | | | |
| Tensile Modulus (GPa) | 9.6 | 9.9 | 9.3 | 9.2 | n/a | n/a | 9.6 | 9.4 | 7.8 | 8.2 |
| Tensile Strength (MPa) | 141.0 | 141.5 | 130.4 | 123.3 | n/a | n/a | 156.8 | 139.4 | 110.6 | 121.1 |
| Izod notched impact (KJ/m$^2$) | 8.0 | 7.9 | 8.7 | 8.4 | n/a | n/a | 8.9 | 9.2 | 9.3 | 9.4 |
| CTI (volts) | 425 | 225 | 575 | 550 | n/a | n/a | 575 | 500 | 475 | 475 |
| GWFI 960° C. @ 1.0 mm | pass | pass | pass | pass | pass | pass | pass | pass | pass | pass |
| UL class @ 0.8 mm | V0 | V0 | V1 | V1 | n/a | n/a | V2 | V0 | V1 | n.c. |
| UL class @ 1.6 mm | V0 | V0 | V1 | V1 | n/a | n/a | V2 | V0 | V1 | n.c. |
| GWIT @ 1.0 mm | 775 | 775 | 775 | 775 | 700 | 725 | 700 | 775 | 775 | 775 |
| GWIT @ 1.6 mm | 775 | 775 | 775 | 775 | 700 | 725 | 725 | 775 | 775 | 775 |

Table 4 contains the test results of unfilled polyamide compositions containing the flame retardant system and a pre-blend of PPE.

TABLE 4

| | CE21 | CE22 | CE23 | CE24 | CE25 |
|---|---|---|---|---|---|
| Components | | | | | |
| PA 6 2,4RV | 44.70 | 47.20 | 42.20 | 36.20 | 24.20 |
| PA66 2,4RV | 44.70 | 47.20 | 42.20 | 36.20 | 24.20 |
| Melamine cyanurate | 10.00 | — | — | — | — |
| Component A | — | 5.00 | 15.00 | 15.00 | 15.00 |
| PPE pre-blend | — | — | — | 12.00 | 36.00 |
| AO1 | 0.20 | 0.20 | 0.20 | 0.20 | 0.20 |
| AO2 | 0.15 | 0.15 | 0.15 | 0.15 | 0.15 |
| Mold release | 0.25 | 0.25 | 0.25 | 0.25 | 0.25 |
| Properties | | | | | |
| Tensile Modulus (GPa) | 3.2 | 3.2 | 3.6 | 2.6 | 2.5 |
| Tensile Strength (MPa) | 72.3 | 72.3 | 64.4 | 90.0 | 85.0 |
| Izod notched impact (KJ/m$^2$) | 4.5 | 4.5 | 4.4 | 5.0 | 5.5 |
| CTI (volts) | 600 | 600 | 600 | 600 | 550 |
| GWFI 960° C. @ 1.0 mm | pass | pass | pass | pass | pass |
| UL class @ 0.8 mm | V0 | V2 | V2 | V2 | V1 |
| UL class @ 1.6 mm | V0 | V2 | V0 | V2 | V0 |
| GWIT @ 1.0 mm (° C.) | 750 | 650 | 675 | 700 | 775 |
| GWIT @ 1.6 mm (° C.) | 700 | 650 | 675 | 725 | 800 |

In Table 4, Comparative Example 21, based on melamine cyanurate, does not pass GWIT at the desired temperature. Comparative Examples 22 and 23 contain 5 and 15 weight percent of the flame retardant system, respectively, but no aromatic polymer. These examples also do not exhibit the desired GWIT performance. Examples 24 and 25 containing PPE showed the increased of GWIT as a function of PPE level. Example 25 provides excellent flammability and electrical performance, as well as the desired minimum GWIT of 775° C.

Table 5 provides the results of glass filled compositions containing styrenic impact modifiers.

TABLE 5

| | CE2 | CE9 | CE10 | CE26 | CE27 | CE28 |
|---|---|---|---|---|---|---|
| Component | | | | | | |
| PA 6 2,4RV | 29.70 | 19.70 | 24.70 | 29.70 | 28.45 | 27.20 |
| PA66 2,4RV | 29.70 | 19.70 | 24.70 | 29.70 | 28.45 | 27.20 |
| Glass fiber | 25.00 | 25.00 | 25.00 | 25.00 | 25.00 | 25.00 |
| Component A | 15.00 | 15.00 | 15.00 | 15.00 | 15.00 | 15.00 |
| SEBS | — | — | — | 10.00 | — | 10.00 |
| SEBS-MA | — | — | — | — | 10.00 | — |
| SMA | — | — | — | — | — | 3.00 |
| AO1 | 0.20 | 0.20 | 0.20 | 0.20 | 0.20 | 0.20 |
| AO2 | 0.15 | 0.15 | 0.15 | 0.15 | 0.15 | 0.15 |
| Mold release | 0.25 | 0.25 | 0.25 | 0.25 | 0.25 | 0.25 |
| Properties | | | | | | |
| Tensile Modulus (GPa) | 9.4 | 9.5 | 9.7 | 7.2 | 7.8 | 7.7 |
| Tensile Strength (MPa) | 140.0 | 138.0 | 125.0 | 116.0 | 117.3 | 111.5 |
| Izod notched impact (KJ/m$^2$) | 9.5 | 9.0 | 7.5 | 11.0 | 12.8 | 11.1 |
| CTI (volts) | 600 | 600 | 600 | 600 | 600 | 600 |
| GWFI 960° C. @ 1.0 mm | pass | pass | pass | pass | pass | pass |
| UL class @ 0.8 mm | V2 | V0 | V0 | V1 | V1 | n.c. |
| UL class @ 1.6 mm | V0 | V0 | V0 | V2 | VI | V1 |
| GWIT @ 1.0 mm | 675 | 700 | 725 | 700 | 700 | 775 |
| GWIT @ 1.6 mm | 725 | 725 | 725 | 725 | 725 | 775 |

As illustrated by Table 5, the compositions containing the flame retardant system and styrenic impact modifiers such as SEBS, SEBSMA, and SMA exhibit excellent impact strength while at the same time maintaining good CTI, GWFI, and GWIT (except for #28 GWIT in all cases is <775) properties.

Table 6 provides the results of glass filled compositions containing untreated nanoclay, e.g., high aspect ratio phyllosilicates to lower the amount of flame retardant Component A (as illustrated in Table 1). The composition of Example 30 was developed through a master batch process. In the example, the layered untreated phyllosilicates were dispersed in the polyamide 6/66 blend matrix. The compounded pellets were next mixed with component A and other additives and fillers.

TABLE 6

| | CE3 | CE11 | CE13 | CE29 | CE30 | CE31 | CE32 | CE33 | CE34 |
|---|---|---|---|---|---|---|---|---|---|
| Component | | | | | | | | | |
| PA 6 2,4RV | 24.70 | 24.70 | 24.70 | 24.70 | 22.2 | 26.5 | 26.5 | 30 | 30 |
| PA66 2,4RV | 24.70 | 24.70 | 24.70 | 24.70 | 22.2 | 10 | 10 | 14 | 14 |
| Glass fiber | 35.00 | 25.00 | 25.00 | 31.00 | 36.00 | 30 | 30 | 30 | 30 |
| Component A | 15.00 | 15.00 | 15.00 | 12.00 | 12.00 | 16 | 16 | 13.5 | 13.5 |
| PEI | — | 10.00 | — | — | — | — | — | — | — |
| PPE-preblend | — | — | 2.50 | — | — | 12.5 | 12.5 | 6.5 | 6.5 |
| PET | — | — | — | — | — | — | — | — | — |
| PC | — | — | — | — | — | — | — | — | — |
| HIPS | — | — | 7.50 | — | — | — | — | — | — |
| Calcinated clay | — | — | — | — | — | 3 | — | 5 | — |
| Untreated nanoclay | — | — | — | 5 | 5 | — | 3 | — | 5 |
| AO1 | 0.20 | 0.20 | 0.20 | 0.20 | 0.20 | 0.2 | 0.2 | 0.2 | 0.2 |
| AO2 | 0.15 | 0.15 | 0.15 | 0.15 | 0.15 | 0.2 | 0.2 | 0.2 | 0.2 |
| Mold release | 0.25 | 0.25 | 0.25 | 0.25 | 0.25 | 0.2 | 0.2 | 0.2 | 0.2 |

TABLE 6-continued

|  | CE3 | CE11 | CE13 | CE29 | CE30 | CE31 | CE32 | CE33 | CE34 |
|---|---|---|---|---|---|---|---|---|---|
| PA 6 powder | 1.40 | 1.40 | 1.40 | 1.40 | 1.40 | 1.4 | 1.4 | 0.4 | 0.4 |
| TSAN | 0.60 | 0.60 | 0.60 | 0.60 | 0.60 | — | — | — | — |
| Properties |  |  |  |  |  |  |  |  |  |
| Tensile Modulus (GPa) | 12.2 | 9.6 | 9.3 | 10.9 | 12.9 | — | — | — | — |
| Tensile Strength (MPa) | 166.5 | 141.0 | 130.4 | — | — | — | — | — | — |
| Izod notched impact (KJ/m$^2$) | 11.2 | 8.0 | 8.7 | — | — | 6.0 | 6.0 | 5.0 | 7.0 |
| CTI (volts) | 600 | 425 | 575 | 550 | 600 | 550 | 550 | 550 | 550 |
| GWFI 960° C. @ 1.0 mm | Pass | pass | pass | pass | pass | 960 | 960 | 960 | 960 |
| UL class @ 0.8 mm | V0 | V0 | V1 | V1 | V1 |  |  |  |  |
| UL class @ 1.6 mm | V0 | V0 | V1 | V0 | V0 | V0 | V0 | V0 | V0 |
| GWIT @ 1.0 mm | 750 | 775 | 775 | 775 | 800 | 750 | 775 | 750 | 775 |
| GWIT @ 1.6 mm | 750 | 775 | 775 | 800 | 800 | 750 | 775 | 750 | 775 |

As illustrated in Table 6, compositions with untreated nanoclay or cacalcinated clay provide excellent properties in ignition behavior, tracking resistance, flame retardancy and processability as compared with compositions containing an aromatic polymer system, i.e., PEI and PPE. The untreated nanoclay compensates for the loss in tracking behavior or in flame performance due to the presence of PEI and PPE.

The invention claimed is:

1. A flame-retardant polyamide composition, comprising a blend of:
a polyamide;
about 5 to about 25 weight percent of a flame retardant system comprising
i) a metal phosphinate or diphosphinate salt; and
ii) at least one nitrogen compound selected from the group consisting of condensation products of melamine and/or reaction products of condensation products of melamine with phosphoric acid, and/or mixtures thereof, including for example melam, melem, melon, melamine cyanurate, melamine phosphate compounds, dimelamine phosphate and/or melamine pyrophosphate, benzoguanamine compounds, terepthalic ester compounds of tris (hydroxyethyl)isocyanurate, allantoin compounds, glycoluril compounds, ammeline, ammelide, and combinations thereof; and
about 2 to about 36 weight percent of at least one aromatic polymer selected from the group consisting of poly (arylene ether), polyetherimide, polyetherimide/polyimide copolymers, poly(arylene sulfide), polysulfone, polyethersulfone, polyetheretherketone, an styrenic impact modifier, and combinations thereof;
wherein all the amounts are based upon the total weight of the composition;
wherein the composition exhibits a Glow Wire Ignition Temperature as measured according to IEC-60695-2-13 of 750° C. or greater at about 1.6 millimeter thickness.

2. The composition of claim 1, further comprising up to 20 weight percent of an untreated, swellable, ion-exchangeable, layered material having nanometer-thick platelets ranging from about 0.9nm to about 1000nm in diameter and an aspect ratio of about 100 to about 1000.

3. The composition of claim 2, where the untreated, swellable, ion-exchangeable, layered material is a phyllosilicate.

4. The composition of claim 2, comprising from 2 to 10 weight percent of an untreated, swellable, ion-exchangeable, layered material having nanometer-thick platelets ranging from about 0.9 nm to about 1000 nm in diameter and an aspect ratio of about 100 to about 1000.

5. The composition of 1, wherein the metal phosphinate salt is of the formula (I) and the metal diphosphinate salt is of the formula (II)

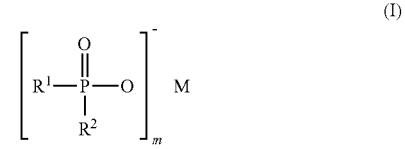

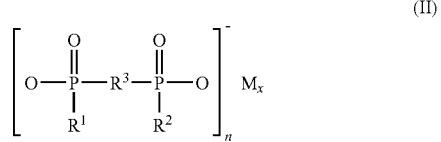

wherein $R^1$ and $R^2$ are each independently hydrogen, a linear or branched $C_1$-$C_6$ alkyl radical, or aryl radical; $R^3$ is a linear or branched $C_1$-$C_{10}$ alkylene, arylene, alkylarylene, or arylalkylene radical; M is calcium, aluminum, magnesium, strontium, barium, or zinc; m is 1, 2 or 3; n is 1 or 3; and x is 1 or 2.

6. The composition of claim 1, wherein the nitrogen compound comprising a compound of the formula (III) to (VIII) or combinations comprising at least one of the foregoing nitrogen compounds

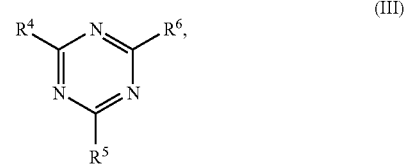

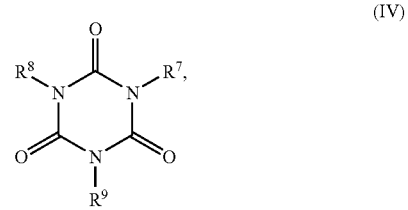

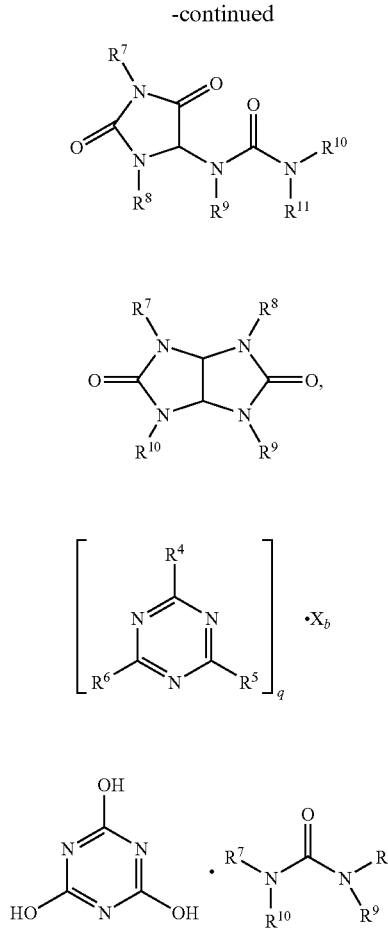

wherein $R^4$, $R^5$, and $R^6$ are independently hydrogen, hydroxy, amino, or mono- or di$C_1$-$C_8$alkyl amino; or $C_1$-$C_8$alkyl, $C_5$-$C_{16}$cycloalkyl, -alkylcycloalkyl, wherein each may be substituted by a hydroxyl or a $C_1$-$C_4$hydroxyalkyl, $C_2$-$C_8$alkenyl, $C_1$-$C_8$alkoxy, -acyl, -acyloxy, $C_6$-$C_{12}$aryl, -O$R^4$ and -N($R^4$)$R^5$; or are N-alicyclic or N-aromatic, where N-alicyclic denotes cyclic nitrogen containing compounds such as pyrrolidine, piperidine, imidazolidine, piperazine, and the like, and N-aromatic denotes nitrogen containing heteroaromatic ring compounds such as pyrrole, pyridine, imidazole, pyrazine, and the like; $R^7$, $R^8$, $R^9$, $R^{10}$, $R^{11}$ are independently hydrogen, $C_1$-$C_8$alkyl, $C_5$-$C_{16}$cycloalkyl or -alkylcycloalkyl, each may be substituted by a hydroxyl or a $C_1$-$C_4$hydroxyalkyl, $C_2$-$C_8$alkenyl, $C_1$-$C_8$alkoxy, -acyl, -acyloxy, $C_6$-$C_{12}$aryl, and -O-$R^4$; X is phosphoric acid or pyrophosphoric acid; q is 1, 2, 3, or 4; and b is 1, 2, 3, or 4.

7. The composition of claim 1, wherein the polyamide is selected from the group consisting of nylon-6, nylon-6,6, nylon4, nylon-4,6, nylon-12, nylon-6,10, nylon-6,9, nylon-6, 12, nylon-9T, copolymer of nylon-6,6 and nylon-6, polyamide copolymers, polyamide blends, and combinations thereof.

8. The composition of claim 1, wherein the polyamide is present in an amount of about 30 to about 96 weight percent based on the total weight of the composition.

9. The composition of claim 1, wherein the aromatic polymer is compatibilized with the polyamide.

10. The composition of claim 1, wherein the aromatic polymer is not compatibilized with the polyamide.

11. The composition of claim 1, wherein the aromatic polymer is poly(arylene ether) or polyetherimide.

12. The composition of claim 1, wherein the aromatic polymer is present in an amount of about 2 to about 10 weight percent based on the total weight of the composition.

13. The composition of claim 1, wherein the aromatic polymer is SMA, or a blend of SMA and SEBS.

14. The composition of claim 1 further comprising up to about 30 weight percent of a low-aspect ratio filler.

15. The composition of claim 11, wherein the low aspect ratio filler is selected from the group consisting of calcinated clay, talc, wollastonite, barium sulfate, mica, barium titanate, salts or esters of orthosilicic acid, silicates, zeolites, silicas, glass powders, glass-ceramic powders, magnesium hydroxide, hydrotalcites, magnesium carbonates, zinc oxide, zinc stannate, zinchydroxystannate, zinc phosphate, zinc borate, zinc sulfide, aluminium phosphate, metal carbonates, and combinations thereof.

16. The composition of claim 1 further comprising up to 50 weight percent of a fibrous filler.

17. The composition of claim 1, further comprising up to about 20 weight percent of a wear additive based on the total weight of the composition, wherein the wear additive is selected from the group consisting of polytetrafluoroethylene, molybdenum disulfide, graphite, aramide, carbon fiber, carbon powder, and combinations thereof.

18. The composition of claim 1, wherein the composition exhibits a rating of V0 according to UL-94 at 1.6 millimeters thickness.

19. The composition of claim 1, wherein the composition exhibits a Glow Wire Flammability Index as measured according to IEC-60695-2-12 of 960° C. or greater at about 1.6 millimeter thickness.

20. The composition of claim 1, wherein the composition exhibits a Comparative tracking index measured according to International Electrotechnical Commission Standard IEC-60112/3rd of class 1 or class 0.

21. An article comprising the composition of claim 1.

22. An article comprising the composition of claim 2.

23. The composition of claim 2, wherein the composition exhibits a Glow Wire Flammability Index as measured according to IEC-60695-2-12 of 960° C. or greater at about 1.6 millimeter thickness.

24. The composition of claim 1, further comprising up to 50 weight percent of a reinforcing fiber of between 2 and 100 mm in length, wherein a test piece comprising the composition has a tensile modulus of at least 9 GPa.

25. Pellets which have been obtained by melt homogenizing the composition of claim 24, extruding the molten product and chopping the extrudate into pellets.

26. An article comprising the composition of claim 18.

27. A flame-retardant polyamide composition, comprising a blend of:
  a polyamide;
  from 5 to 25 weight percent of a flame retardant system comprising;
    i) a metal phosphinate or diphosphinate salt; and ii) at least one nitrogen compound selected from the group consisting of condensation products of melamine and/or reaction products of condensation products of melamine with phosphoric acid, and/or mixtures thereof, including for example melam, melem, melon, melamine cyanurate, melamine phosphate compounds, dimelamine phosphate and/or melamine pyrophosphate, benzoguanamine compounds, terepthalic ester compounds of tris(hydroxyethyl)isocyanurate, allantoin compounds, glycoluril compounds, ammeline, ammelide, and combinations thereof; and up to 20 weight percent of an untreated, swellable, ion-exchangeable, layered material having nanometer-thick platelets ranging from 0.9 nm to 1000 nm in diameter and an aspect ratio of 100 to 1000;

wherein the composition exhibits a Glow Wire Ignition Temperature as measured according to IEC-60695-2-13 of 750° C. or greater at 1.6 millimeter thickness.

* * * * *